United States Patent [19]

Kern

[11] Patent Number: 4,625,488
[45] Date of Patent: Dec. 2, 1986

[54] WALL ATTACHMENT CLIP FOR SUSPENDED WOODBEAM CEILING

[76] Inventor: Gilbert G. Kern, 515 N. Victory Blvd., Burbank, Calif. 91502

[21] Appl. No.: 726,142

[22] Filed: Apr. 22, 1985

Related U.S. Application Data

[60] Continuation-in-part of Ser. No. 598,410, Apr. 9, 1984, Pat. No. 4,525,971, which is a division of Ser. No. 407,652, Aug. 12, 1982, Pat. No. 4,464,876, which is a continuation-in-part of Ser. No. 259,858, May 4, 1981, Pat. No. 4,454,700, which is a continuation-in-part of Ser. No. 28,904, Apr. 10, 1979, Pat. No. 4,281,498.

[51] Int. Cl.$^4$ ............................................. E04B 5/52
[52] U.S. Cl. ................................. 52/665; 52/484; 403/232.1; 403/403
[58] Field of Search ................. 52/664, 484, 665; 403/232.1, 262, 199, 203, 403

[56] References Cited

U.S. PATENT DOCUMENTS

| | | | |
|---|---|---|---|
| 2,710,674 | 6/1955 | Bibb | 52/484 |
| 3,188,696 | 6/1965 | Earhart | 403/262 |
| 3,232,021 | 2/1966 | Wilson | 52/484 |
| 3,329,387 | 7/1967 | Fischer | 52/484 |
| 3,601,428 | 8/1971 | Gilb | 403/232.1 |
| 3,809,358 | 5/1974 | Hazeley | 52/484 |
| 4,198,175 | 4/1980 | Knepp | 403/232.1 |
| 4,367,616 | 1/1983 | Pearson | 52/664 |
| 4,454,700 | 6/1984 | Kern | 403/237 |

FOREIGN PATENT DOCUMENTS

| | | | |
|---|---|---|---|
| 2143160 | 3/1973 | Fed. Rep. of Germany | 52/665 |
| 422765 | 1/1935 | United Kingdom | 403/232.1 |

*Primary Examiner*—Henry E. Raduazo
*Attorney, Agent, or Firm*—Bernard P. Drachlis

[57] ABSTRACT

The suspended woodbeam ceiling is formed of a plurality of beams which lie spaced from each other and at right angles from each other to receive drop-in ceiling panels therebetween. These beams are supported and interconnected by means of various clips and are secured to the wall rail with the wall attachment clip of this invention. The wall attachment clip engages on a beam by dimples engaging in the body of the wood and has turned-out flanges which have screw holes through which screws connect it to the wall rail.

4 Claims, 4 Drawing Figures

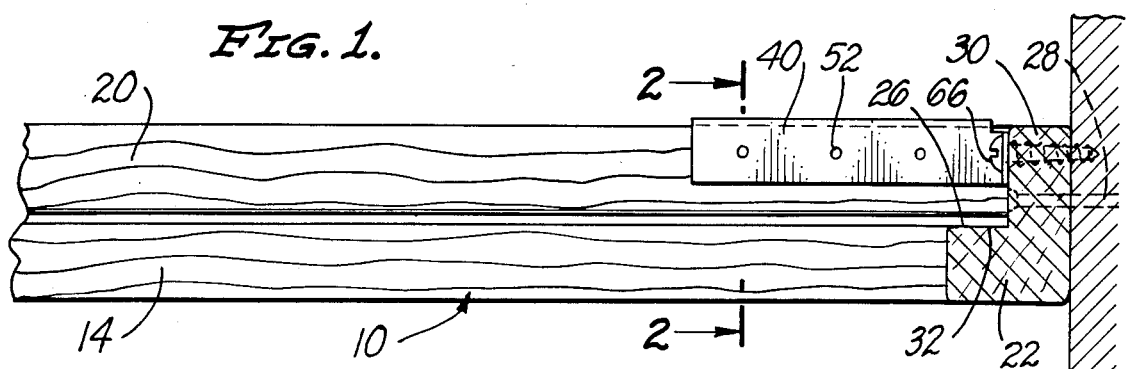
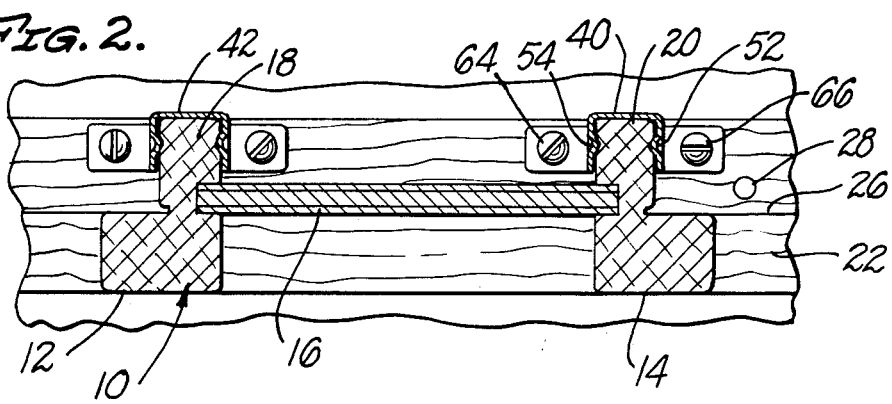
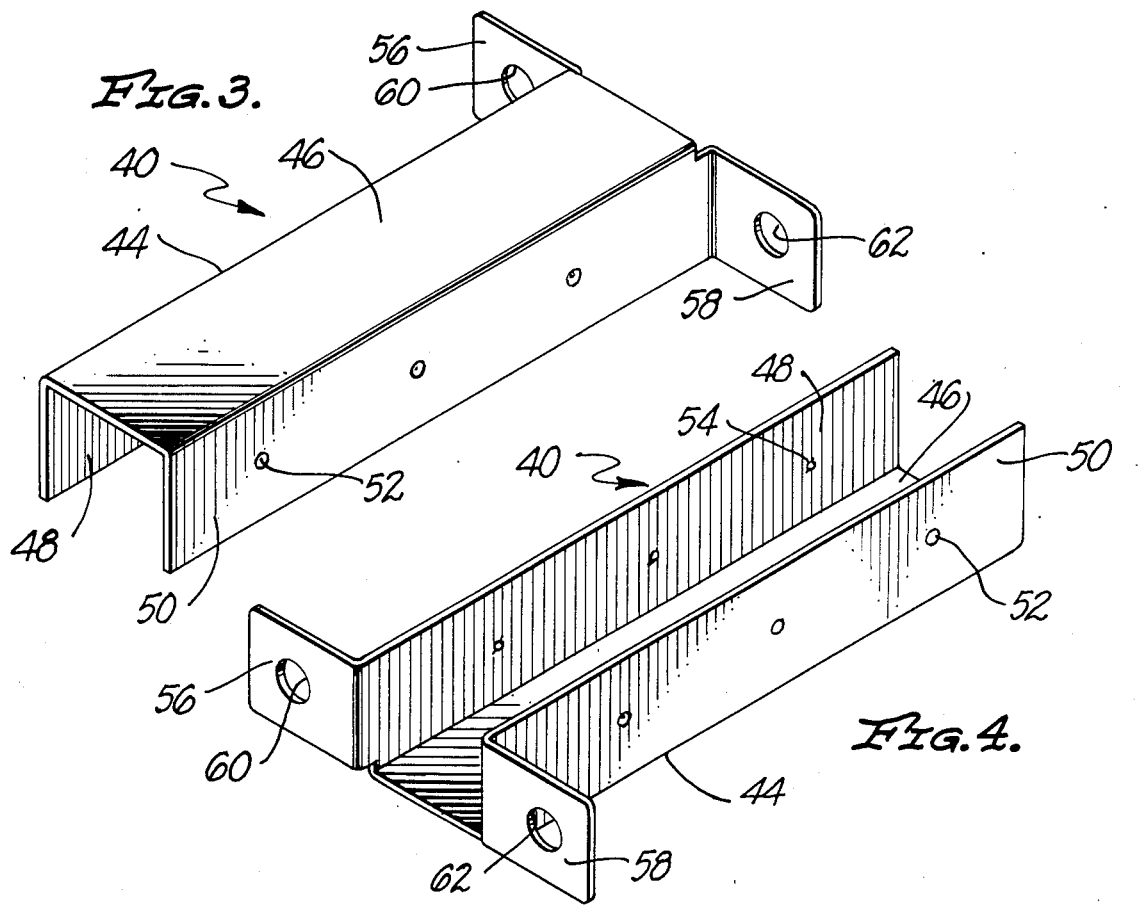

WALL ATTACHMENT CLIP FOR SUSPENDED WOODBEAM CEILING

CROSS REFERENCE

This application is a continuation-in-part of my application Ser. No. 598,410 filed Apr. 9, 1984 for "Attachment Clip for Suspended Woodbeam Ceiling," now Pat. No. 4,525,971, which was a division of my application Ser. No. 407,652 filed Aug. 12, 1982 for "Suspended Woodbeam Ceiling," now U.S. Pat. No. 4,464,876 and that application was a continuation-in-part of my earlier filed application Ser. No. 259,858 filed May 4, 1981, entitled "Suspended Woodbeam Ceiling," now U.S. Pat. No. 4,454,700, which, in turn, was a continuation-in-part of my earlier filed application Ser. No. 28,904 filed Apr. 10, 1979, entitled "Suspended Woodbeam Ceiling," now U.S. Pat. No. 4,281,498. The disclosure of each of these prior cases is incorporated herein in its entirety.

BACKGROUND

This invention is directed to a suspended woodbeam ceiling construction, and more particularly to the wall attachment clip for the interconnection and support of the woodbeams of the suspended ceiling with respect to the adjacent wall.

Many commercial buildings have overhead air conditioning duct work, pipes and electrical wiring. A suspended ceiling is positioned therebelow to provide a ceiling for the personnel space. The suspended ceiling is often in the shape of an inverted T-bar which is hung on wires from the overhead. Drop-in ceiling panels lie on the crossbars of the T. This permits ready removal of the panels to execute repairs to the overhead equpment.

Some older homes have high ceilings, and it is desirable to install a suspended ceiling therein. Other homes have plaster ceilings which require extensive repair. In such cases a suspended ceiling is desirable. Furthermore, in modern construction, translucent light panels and opaque decorative panels can serve to enhance decor, particularly of a room which can be enhanced by subdued overhead lighting. There is need for attachment devices which suitably secure together woodbeams of such suspended ceilings.

SUMMARY

In order to aid in the understanding of this invention, it can be stated in essentially summary form that it is directed to a suspended woodbeam ceiling construction, and particularly to the wall attachment clips which attach the wooden beam to the adjacent wall rail.

It is, thus, an object of this invention to provide a suspended woodbeam ceiling construction which is aesthetic so that it can be employed in locations where an attractive woodbeam ceiling is desirable. It is another object of this invention to provide a woodbeam ceiling construction wherein a beam is formed of a center with two sides, each being made of wood or simulated wood so that the sides present lips for the support of drop-in ceiling panels. It is a further object to provide wall attachment devices which attach such beams to the adjacent wall so that the beams and the ceiling panels associated therewith are properly supported.

Other objects and advantages of this invention will become apparent from a study of the following portion of the specification, the claims and the attached drawings.

BRIEF DESCRIPTION OF THE DRAWINGS

FIG. 1 is a side-elevational view of a woodbeam in a suspended woodbeam ceiling, showing the woodbeam abutting a wall rail, taken in section, and showing a side-elevational view of the wall rail attachment clip.

FIG. 2 is a section taken generally along the line 2—2 of FIG. 1, showing two of the wall attachment clips in association with a woodbeam, and securing the woodbeam to a wall rail.

FIG. 3 is an isometric view of one of the wall attachment clips in accordance with this invention.

FIG. 4 is a view similar to FIG. 3, showing the wall attachment clip turned over.

DESCRIPTION OF THE PREFERRED EMBODIMENT

FIGS. 1 and 2 show parts of a suspended woodbeam ceiling, of the type described in the disclosures of the above-identified cross references. The woodbeam ceiling includes a plurality of beams, one of which is indicated at 10. Beam 10 has beam sides 12 and 14 which are L-shaped and which are rabbeted to receive the flat beam center 16. The L-shape of the beam sides present upwardly directed surfaces on which ceiling panels can rest. The beams are secured with respect to each other to form the space for these ceiling panels. The beam sides have upstanding webs 18 and 20 which extend above the beam center.

Wall rail 22 is also L-shaped and may have the same cross section as one of the beam sides. Wall rail 22 is secured to wall 24 around the periphery of the room, preferably with the top surface 26 of the L on a horizontal plane. Securement is preferably by a fastening means such as nail 28 through the web 30 above the top surface 26, so that the nail is not visible after the ceiling panel is put in place.

Beam 10, and such other similar beams as reach the wall rail, must be secured with respect to the wall rail. First, the lower part of the beam sides, below the web are removed to produce a downwardly facing surface 32. When the downwardly facing surface lies against the top surface 26, the bottom of wall rail 22 is in line with the bottom of the beam and the tops of the L surfaces on the beam and wall rail are in alignment to receive the ceiling panel. The beam is put in place against the wall rail, as shown in FIGS. 1 and 2.

In order to maintain the beam in position with respect to the wall rail, wall attachment clip 40 of this invention is provided. One of the wall attachment clips goes over each of the beam sides, with the wall attachment clip 40 being mounted on web 20 and an identical wall attachment clip 42 being positioned on and secured to web 18. Wall attachment clip 40 is shown in more detail in FIGS. 3 and 4. Wall attachment clip 40 has a body 44 of generally U-shape. It has web 46 and flanges 48 and 50. The web is of such width that the channel defined by the web and flanges can fit down over the web 20, as shown in FIGS. 1 and 2. The wall attachment clip is bent of sheet metal and part of the stamping and bending operation includes the stamping of dimples into the flanges. Dimples 52 and 54 are respectively stamped into the side flanges 50 and 48, as is indicated in FIGS. 3 and 4. These dimples are shown as impressing into the upstanding web 20 in FIG. 2. The dimples are preferably struck so that there are inwardly directed sharp points which engage in the wood of the upstanding web so as to secure the wall attachment clips in place. As is seen in FIGS. 3 and 4, there are three such dimples on each of the flanges 48 and 50, to assure securement. With this construction, the wall attachment clip is firmly attached over the webs of the beam.

Outwardly directed tabs 56 and 58 are respectively formed on the ends of flanges 48 and 50. These tabs respectively contain screw holes 60 and 62. When the wall attachment clip is suitably positioned on the beam and the beam is brought up adjacent the wall rail, the tabs lie against the upstanding web portion 30 of the L. Thereupon, screws 64 and 66 are put in place to engage through the tabs and into the web 30. In this way, beam 10 is secured against the wall rail. A wall attachment clip 40 is employed wherever such security is required for a proper suspended woodbeam ceiling installation. The wall attachment clips are quickly installed by crimping them over the upstanding beam sides so that the dimples are firmly engaged. While forming of the wall attachment clip from stamp sheet metal is the desired material and method, it is clear that it could be formed of injection-molded synthetic polymer composition material. In such a case, attachment of the attachment clip to the beam could be supplemented by a penetrating fastener such as a brad or staple. Thus, the wall attachment clip in accordance with this invention cooperates with the various other parts of the suspended woodbeam ceiling described in the cross-referenced disclosures to form a part of a suspended woodbeam ceiling system.

This invention has been described in its presently contemplated best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. An attachment clip in combination with a suspended woodbeam ceiling wherein said woodbeam ceiling comprises:

a wood ceiling beam comprising first and second longitudinal woodbeam side members, each having an upstanding web, a beam center attached to and positioned between said woodbeam side members to maintain said side members in spaced relationship;

a wall rail, said wall rail being made of wood and being for securement against the wall of a room at the level of said suspended woodbeam ceiling, said wall rail lying at right angles to said beam so that both of the upstanding woodbeam side members on said beam lie against said wall rail, and wherein said attachment clip comprises:

a body having a web and first and second flanges attached to said web and extending substantially parallel to each other and forming an inverted U-shaped body lying on said upstanding web of one of said longitudinal woodbeam side member, inwardly directed points on both said flanges, said attachment clip being made of stamped metal and said inwardly directed points being stamped from said flanges to extend into the interior U-shaped channel between said flanges, said inverted U-shaped body being positioned down over the upstanding web of one of said first and second upstanding longitudinal woodbeam side members of said beam with said web of said body lying on said web of said side member with said points on both said flanges engaging in said web of said upstanding longitudinal woodbeam side member upon which it is engaged to retain said body of said attachment clip onto said beam;

first and second tabs formed on said body respectively secured to said first and second flanges, said tabs being bent away from each other to lie substantially in a plane and lie against the face of said wall rail, said tabs each having an opening therein and a fastening member engaged through said opening into said wall rail to retain said beam adjacent said wall rail.

2. An attachment clip in combination with a suspended woodbeam ceiling wherein said woodbeam ceiling comprises:

a wood ceiling beam comprising first and second longitudinal woodbeam side members, each having an upstanding web, a beam center attached to and positioned between said woodbeam side members to maintain said side members in spaced relationship;

a wall rail, said wall rail being made of wood and being for securement against the wall of a room at the level of said suspended woodbeam ceiling, said wall railing lying at right angles to said beam so that both of the upstanding woodbeam side members on said beam lie against said wall rail, and wherein said attachment clip comprises:

a body having a web and first and second flanges attached to said web and extending substantially parallel to each other and forming an inverted U-shaped body lying on said upstanding web of one of said longitudinal woodbeam side member, inwardly directed points on both said flanges, said attachment clip being made of stamped metal and said inwardly directed points being stamped from said flanges to extend into the interior U-shaped channel between said flanges, said inverted U-shaped body being positioned down over the upstanding web of one of said first and second upstanding longitudinal woodbeam side members of said beam with said web of said body having on said web of said side member with said points on both said flanges engaging in said web of said upstanding longitudinal woodbeam side member upon which it is engaged to retain said body of said attachment clip onto said beam;

first and second tabs formed on said body respectively secured to said first and second flanges, said tabs being bent away from each other to lie substantially in a plane and lie against the face of said wall rail, a screw opening in each of said tabs and a screw fastened through each of said screw openings in said tabs to secure said attachment clip and said beam against said wall rail.

3. An attachment clip in combination with a suspended woodbeam ceiling wherein said woodbeam ceiling comprises:

a wood ceiling beam comprising first and second longitudinal woodbeam side members, each having an upstanding web, a beam center attached to and positioned between said woodbeam side members to maintain said side members in spaced relationship;

a wall rail, said wall rail being made of wood and being for securement against the wall of a room at the level of said suspended woodbeam ceiling, said wall rail lying at right angles to said beam so that both of the upstanding woodbeam side members on said beam lie against said wall rail, and wherein said attachment clip comprises:

a body having a web and first and second flanges attached to said web and extending substantially parallel to each other and forming an inverted U-shaped body lying on said upstanding web of one of said longitudinal woodbeam side member, inwardly directed points on both said flanges, said attachment clip being made of stamped metal and said inwardly directed points being stamped from said flanges to extend into the interior U-shaped channel between said flanges, one of said attachment clips being engaged over each one of said webs of said first and second upstanding longitudinal woodbeam side members of said beam with said web of said body lying on said web of said side member with said points on both said flanges engaging in said web of said upstanding longitudinal woodbeam side member upon which it is engaged to retain said body of said attachment clip onto said beam;

first and second tabs formed on said body respectively secured to said first and second flanges, said tabs being bent away from each other to lie substantially in a plane and lie against the face of said wall rail, said tabs each having an opening therein and a fastening member engaged through said opening into said wall rail to retain said beam adjacent said wall rail.

4. The combination of claim 3 wherein there is a screw opening in each of said tabs and a screw is fastened through each of said screw openings in said tabs to secure said attachment clip and said beam against said wall rail.

* * * * *